United States Patent Office 2,853,432
Patented Sept. 23, 1958

2,853,432

REGENERATION OF USED ALKALINE REAGENTS BY OXIDIZING THE SAME IN THE PRESENCE OF A PHTHALOCYANINE CATALYST

William K. T. Gleim, Orland Park, and Peter Urban, Chicago, Ill., assignors to Universal Oil Products Company, Des Plaines, Ill., a corporation of Delaware No Drawing. Application December 28, 1954
Serial No. 478,191

20 Claims. (Cl. 196—32)

This invention relates to the regeneration of used alkaline reagents and more particularly to an improvement in the method of effecting the regeneration of alkaline reagents which have been used in the treatment of hydrocarbon or other organic compositions for the removal of acidic components and particularly sulfur-containing impurities.

Hydrocarbon or other organic compositions containing sulfur compounds and other acidic impurities may be treated with an alkaline reagent in order to remove the impurities. Any suitable alkaline reagent may be employed including particularly sodium hydroxide (caustic), potassium hydroxide, etc. The alkaline reagent generally is utilized as an aqueous solution of from about 5% to about 50% weight concentration and, when desired, solutizers, solubilizing agents, etc., are employed including, for example, alcohols and particularly methanol, ethanol, etc., phenols, cresols, butyric acid, etc., in order to increase the contact and/or reaction of the acidic components with the alkaline reagent.

The alkaline solutions are especially suitable for the purification of hydrocarbon fractions and particularly sour gasolines including cracked gasoline, straight run gasoline or mixtures thereof, naphtha, jet fuel, kerosene, aromatic solvent, stove oil, range oil, burner oil, fuel oil, etc. Other hydrocarbon fractions include lubricating oil, gas oil, etc., as well as normally gaseous fractions. In addition, other organic fractions containing acidic impurities which may be treated in this manner include, for example, alcohols, ketones, aldehydes, etc.

After the hydrocarbon or other organic fraction has been contacted with the alkaline reagent and the acidic components reacted with and/or absorbed in the alkaline reagent, the purified fraction is separated from the alkaline solution. The alkaline solution then is sent for regeneration in order to remove the acidic components and to restore the activity of the alkaline reagent for further use in the process.

One method of regenerating used alkaline solution is by steaming at high temperature. The use of high temperature is objectionable because it causes extensive damage to the plant equipment. Regeneration with air has not been satisfactory because sufficient regeneration is not obtained. We now have found that satisfactory regeneration with air may be effected by oxidizing the spent alkaline solution in the presence of a particular catalyst.

In one embodiment the present invention relates to a method of regenerating an alkaline reagent used for the removal of acidic components from organic compounds, which comprises oxidizing the alkaline reagent in the presence of a metal phthalocyanine catalyst.

In a specific embodiment, the present invention relates to a method of regenerating caustic solution used for the removal of mercaptans from gasoline which comprises oxidizing the used caustic solution in the presence of iron phthalocyanine.

Any suitable phthalocyanine catalyst may be utilized in accordance with the present invention and more particularly comprises a metal phthalocyanine. Particularly preferred metal phthalocyanines include iron phthalocyanine, cobalt phthalocyanine, manganese phthalocyanine and vanadium phthalocyanine. Other metal phthalocyanines, include copper phthalocyanine, magnesium phthalocyanine, zinc phthalocyanine, titanium phthalocyanine, hafnium phthalocyanine, thorium phthalocyanine, tin phthalocyanine, lead phthalocyanine, columbium phthalocyanine, tantalum phthalocyanine, antimony phthalocyanine, bismuth phthalocyanine, chromium phthalocyanine, molybdenum phthalocyanine, nickel phthalocyanine, palladium phthalocyanine, platinum phthalocyanine, silver phthalocyanine, mercury phthalocyanine, etc. These specific phthalocyanines are set forth for illustrative purposes and not with the intention of limiting the present invention thereto. It is understood that any suitable metal phthalocyanine may be employed and that, when desired, a mixture of metal phthalocyanine compounds may be utilized. The various metal phthalocyanines are not necessarily equivalent. The particular metal phthalocyanine to be used will depend upon its solubility and effectiveness in the particular alkaline reagent being regenerated.

In general, the metal phthalocyanines are not readily soluble in aqueous alkaline solutions and, therefore, for improved operation it is preferable to utilize a derivative thereof. A particularly suitable method for increasing solubility of metal phthalocyanines is to prepare sulfonated derivatives. The sulfonated derivatives may be prepared in any suitable manner and in some cases are available for purchase in the open market. For example, copper phthalocyanine sulfonate is available commercially under the trade name of Pontamine, Fast Turquoise 8 GLD. Sulfonic acid derivatives of other metal phthalocyanines may be prepared in any suitable manner. For example, the sulfonate of iron phthalocyanines was prepared by reacting iron phthalocyanine with 20% fuming sulfuric acid.

While the sulfonic acid derivatives are preferred, it is understood that other suitable derivatives may be employed in accordance with the present invention. For example, the carboxylated derivatives may be utilized. They may be prepared in any suitable manner as, for example, by the action of trichloroacetic acid on the metal phthalocyanine or by the action of phosgene and aluminum chloride. In the latter reaction, the acid chloride is formed and it may be converted to the desired carboxylated derivative by conventional hydrolysis. In still another method, other derivatives may be formed by a plurality of conventional reaction steps. Here again, the various derivatives are not necessarily equivalent.

While the metal phthalocyanine compound may be utilized as such, it advantageously may be, and in many cases preferably is, utilized in association with a solid carrier. In some cases, the carrier also may exert a catalytic effect and, in such cases, the combined effect is usually greater than obtained by either component alone. In still other cases, the carrier may serve merely as a means of dispersing the active component and to extend the available surface. Any suitable carrier may be employed. As will be shown by the examples appended to the present specifications, charcoal is particularly suitable for this purpose. Any suitable charcoal may be employed. Illustrative charcoals include bone char, wood charcoal, charcoal made from coconut or other nut shells, fruit pits, etc.

The metal phthalocyanine compound may be composited with the carrier in any suitable manner. In one method, the metal phthalocyanine may be dissolved in a suitable solvent and the solid carrier soaked, suspended, immersed, etc., therein. In another method, the solution of phthalocyanine may be sprayed onto or otherwise contacted with the solid carrier. A preferred solvent for this purpose comprises an alcohol and particularly methanol. Other solvents include ethanol, propanol, butanol, etc., acetone, methyl ethyl ketone, etc., dimethyl ether, diethyl ether, etc., hydrocarbons, etc.

Regeneration of the used alkaline reagent may be effected in any suitable manner and either in batch or continuous operation. In a continuous process, for example, the used alkaline reagent is continuously supplied to a regeneration zone containing the metal phthalocyanine catalyst and/or to which the metal phthalocyanine catalyst is continuously or intermittently introduced. Air, oxygen or other oxidizing gas is supplied to the regeneration zone. The amount of phthalocyanine catalyst to be used in the regeneration zone may vary considerably and will depend upon the particular alkaline reagent and the acidic impurities. The amount of phthalocyanine may range from about 0.0001% to 20% or more of the alkaline reagent. The regeneration may be effected at ambient temperature or at an elevated temperature which generally will not exceed about 200° F. In the regeneration the alkaline solution is substantially restored to the original composition. Thus, for example, in the regeneration of caustic solution, mercaptides are oxidized to disulfides. The disulfides formed or present in the regeneration are withdrawn by skimming or by dissolving in a suitable solvent like solvent naphtha. The regenerated alkaline solution is withdrawn from the regeneration zone and preferably is continuously or intermittently returned to the treating zone for further use in the purification of the hydrocarbon distillate. The presence of the carrier in the hydrocarbon distillate may be objectionable and, in the embodiment in which the metal phthalocyanine is associated with a carrier, the regenerated caustic solution is filtered, settled or otherwise treated to insure that it is free from entrained charcoal and, therefore, will not contain the charcoal when contacting the hydrocarbon distillate. Another means of regeneration passes the sour caustic over a fixed bed, like for instance coke, on which the catalyst is adsorbed.

Another advantage to the process of the present invention is that the metal phthalocyanine compounds are exceedingly stable and will not decompose during the regeneration to release metallic components which subsequently may become entrained in the hydrocarbon distillate. These metal components act catalytically to accelerate gum formation, for example, and, therefore, it is of extreme importance to avoid introducing the metal components into the gasoline. In this respect, the metal phthalocyanines of the present invention are considerably more desirable than other metal chelates which do decompose to release the metal components.

Still another advantage to the process of the present invention is that the acidic components and particularly sulfur compounds are transferred from the hydrocarbon phase of the alkaline reagent phase and thereby will be removed from the hydrocarbon distillate. This is of particular advantage in the treatment of gasoline, for example, because the sulfur compounds are not allowed to remain in the gasoline, as occurs in some treating processes in which the mercaptans are oxidized to disulfides which, in turn, are dissolved in the gasoline. The presence of sulfur compounds is detrimental on the octane number of gasoline and is objectionable for this and other reasons. Still another important advantage to the present invention is that the alkaline solution is regenerated and thereby avoids the problem of disposing of the spent alkaline solution. Because of possible pollution of water streams, strict restrictions are placed on the discharge of spent alkaline solutions into such streams.

The regeneration step may be improved by the addition of a liquid immiscible with the caustic but capable of dissolving certain organic disulfides. In particular, petroleum fractions often contain thiophenol which is absorbed by the alkaline solution. The oxidation of thiophenol on the surface of the solid catalyst results in the formation of diphenyldisulfide, a solid which occludes the catalyst and destroys its activity. The addition of a small amount of hydrocarbon to the caustic during the air regeneration would dissolve the diphenyldisulfide and render the catalyst active again. When the regenerated alkaline solution is settled, the oil is decanted.

While the phthalocyanine compounds are preferred, in some cases azaporphyrines and/or porphyrines, also referred to as azaporphins and porphins, respectively, may be employed. It will be noted that these compounds are somewhat related structurally to the phthalocyanines and thus will be of use in catalyzing the oxidation of mercaptans during the regeneration of used alkaline solutions.

The following examples are introduced to illustrate further the novelty and utility of the present invention but not with the intention of unduly limiting the same.

EXAMPLE I

These runs were made wih n-butyl mercaptan and 5% aqueous potassium hydroxide solution. Liquid n-butyl mercaptan was commingled with 5% aqueous potassium hydroxide solution. The concentration of mercaptan was determined in the original as well as in the treated solutions by titrating with silver nitrate solution. In this and the following examples, the concentration of —SH was in the range of 0.3–0.5% by weight of the alkaline solution. The phthalocyanine compound used in this example was copper phthalocyanine disulfonate and was utilized in a concentration of 0.01 mol per liter of potassium hydroxide solution.

The alkaline solution containing mercaptan and phthalocyanine compound, as well as a control sample of the alkaline solution and mercaptan but not containing the phthalocyanine compound, was stirred vigorously in open air. The percent mercaptans remaining in the solution was determined in the manner hereinbefore set forth after specified periods of contacting, and are reported in the following table:

*Table I*

| Time, Minutes | Percent RSH | |
|---|---|---|
| | Control Sample | Sample Containing Phthalocyanine |
| 0 | 100 | 100 |
| 10 | 84 | 43 |
| 20 | 77 | 21 |
| 30 | 65 | 4 |

It will be noted from the data in the above table that the solution regenerated with the phthalocyanine compound contained only 4% of the mercaptan sulfur originally present after 30 minutes, whereas the sample without the metal phthalocyanine compound still had a 65% of the original mercaptan sulfur content. This illustrates the improved advantages in oxidizing the mercaptans contained in the alkaline solution.

EXAMPLE II

The runs in this example were made in substantially the same manner as described in Example I except that the potassium hydroxide solution used was a 30% potassium hydroxide solution. The results obtained in these runs are reported in the following table:

Table II

| Time, Minutes | Percent RSH | |
|---|---|---|
| | Control Sample | Sample Containing Metal Phthalocyanine |
| 0 | 100 | 100 |
| 10 | 98 | 77 |
| 20 | 95 | 42 |
| 30 | 89 | 21 |

Here again it will be noted that the phthalocyanine compound (copper phthalocyanine disulfonate) served to considerably accelerate oxidation of the mercaptan.

EXAMPLE III

The runs in these examples were made in substantially the same manner as described in Example I except that the alkaline solution was a 4% sodium hydroxide solution. The results of these runs are reported in the following table:

Table III

| Time, Minutes | Percent RSH | |
|---|---|---|
| | Control Sample | Sample Containing Metal Phthalocyanine |
| 0 | 100 | 100 |
| 15 | 76 | 35 |
| 30 | 63 | 12.5 |

Here again it will be noted that the phthalocyanine compound (copper phthalocyanine disulfonate) served to considerably accelerate oxidation of the mercaptan.

EXAMPLE IV

The runs in this example were made in substantially the same manner as described in Example I utilizing n-butyl mercaptan and 5% potassium hydroxide solution. However, the phthalocyanine compound in this example is iron phthalocyanine associated with a charcoal carrier. The charcoal used as the carrier was Norite A which is available commercially. A 0.02% iron phthalocyanine on Norite A catalyst was prepared by evaporating an 0.1% iron phthalocyanine in methanol solution together with the appropriate amount of Norite A on a steam bath. The catalyst was utilized in a concentration of 0.1% by weight, which is equal to 0.2 p. p. m. (parts per million) of Fe for the whole solution. The results of these runs are reported in the following table:

Table IV

| Time, Minutes | Percent RSH | |
|---|---|---|
| | Control Sample | Sample Containing Phthalocyanine |
| 0 | 100 | 100 |
| 15 | 100 | 47 |
| 30 | 87 | 4 |

It will be noted that the phthalocyanine-charcoal catalyst served to considerably reduce the percent mercaptans remaining in the regenerated potassium hydroxide solution. In contrast to the above results, in another run using Norite A alone as the catalyst, the percent mercaptans after 30 minutes was 22. It will be noted that the combination of phthalocyanine and charcoal served to produce improved results over the use of Norite A alone.

EXAMPLE V

In the previous examples, the mercaptan utilized was n-butyl mercaptan. In the present example, the mercaptan is sec-butyl mercaptan. This run was effected in substantially the same manner as described in the previous examples. The alkaline solution was 5% potassium hydroxide solution and the phthalocyanine compound was iron phthalocyanine associated with Norite A. The catalyst was used in a concentration of 0.1% by weight of the alkaline solution. The results of these runs are shown in the following table.

Table V

| Time, Minutes | Percent RSH | |
|---|---|---|
| | Control Sample | Sample Containing Phthalocyanine |
| 0 | 100 | 100 |
| 15 | 68 | 7.5 |
| 30 | 45 | 0 |

As can be seen from the data in the above table, the phthalocyanine compound served to considerably accelerate regeneration of the alkaline solution.

EXAMPLE VI

The mercaptan compound used in this example was thiophenol. The alkaline solution was 4% potassium hydroxide solution and the phthalocyanine compound was 0.1% by weight of the composite of iron phthalocyanine and Norite A. The results of these runs are reported in the following table:

Table VI

| Time, Minutes | Percent RSH | |
|---|---|---|
| | Control Sample | Sample Containing Phthalocyanine |
| 0 | 100 | 100 |
| 15 | 100 | 66 |
| 30 | 100 | 55 |

It will be noted that the catalyst in this case served to considerably improve oxidation of the thiophenol, whereas no oxidation was effected in the absence of the catalyst.

EXAMPLE VII

The sulfur compound used in this example was hydrogen sulfide and was introduced into the alkaline solution by bubbling the gas therethrough. The alkaline solution was the same as described in Example VI. The results of these runs are reported in the following table:

Table VII

| Time, Minutes | Percent RSH | |
|---|---|---|
| | Control Sample | Sample Containing Phthalocyanine |
| 0 | 100 | 100 |
| 15 | 100 | 59 |
| 30 | 100 | 22 |

Here again it will be noted that no oxidation of the hydrogen sulfide occurred in the absence of the catalyst but that 78% of the hydrogen sulfide was oxidized in the presence of the catalyst.

EXAMPLE VIII

The phthalocyanine compound used in this example was iron phthalocyanine disulfonate and was prepared in the manner hereinbefore set forth. A 24% sodium hydroxide solution was used as the alkaline reagent. 0.1% of n-butyl mercaptan was commingled therewith. Complete oxidation of the mercaptan was effected within 50 minutes when regenerating with air in the manner hereinbefore set forth.

We claim as our invention:

1. In a regeneration of used alkaline reagent, the improvement which comprises oxidizing the same in the presence of a phthalocyanine catalyst.

2. In a regeneration of alkaline solution used for the removal of acidic components from hydrocarbon distillate, the improvement which comprises oxidizing said alkaline solution in the presence of a metal phthalocyanine.

3. In the regeneration of caustic solution used for the removal of acidic components from hydrocarbon distillate, the improvement which comprises oxidizing said caustic solution in the presence of iron phthalocyanine associated with charcoal.

4. In the regeneration of caustic solution used for the removal of acidic components from hydrocarbon distillate, the improvement which comprises oxidizing said caustic solution in the presence of iron phthalocyanine disulfonate.

5. In the regeneration of caustic solution used for the removal of acidic components from hydrocarbon distillate, the improvement which comprises oxidizing said caustic solution in the presence of iron phthalocyanine disulfonate associated with charcoal.

6. The process which comprises treating an organic composition containing acidic components with an alkaline reagent, separating used alkaline reagent from purified organic composition, regenerating the used alkaline reagent by oxidizing the same in the presence of a phthalocyanine catalyst, separating the regenerated alkaline reagent and supplying the same for use in the treatment of additional organic composition.

7. The process which comprises purifying sour gasoline by treating with an aqueous alkaline solution, separating the used alkaline solution from purified gasoline, regenerating the used alkaline solution by oxidizing the same in the presence of a phthalocyanine catalyst, and subsequently reusing the regenerated alkaline solution for treating an additional quantity of sour gasoline.

8. The process of claim 7 further characterized in that said alkaline solution comprises a caustic solution.

9. The process of claim 7 further characterized in that said alkaline solution comprises a potassium hydroxide solution.

10. The process of claim 7 further characterized in that said phthalocyanine catalyst comprises iron phthalocyanine.

11. The process of claim 7 further characterized in that said phthalocyanine catalyst comprises iron phthalocyanine disulfonate.

12. The process of claim 7 further characterized in that said phthalocyanine catalyst comprises iron phthalocyanine associated with a charcoal carrier.

13. The process of claim 12 further characterized in that said regenerated caustic solution is treated to remove entrained catalyst before reusing the caustic solution for treating an additional quantity of gasoline.

14. The process of claim 13 further characterized in that said treatment of the regenerated caustic solution to remove catalyst is effected by filtering.

15. The process of claim 7 further characterized in that said phthalocyanine catalyst comprises cobalt phthalocyanine disulfonate.

16. The process of claim 7 further characterized in that said phthalocyanine catalyst comprises vanadium phthalocyanine disulfonate.

17. In the regeneration of caustic solution used for the removal of acidic components from hydrocarbon distillate, the improvement which comprises oxidizing said caustic solution in the presence of cobalt phthalocyanine disulfonate.

18. In the regeneration of caustic solution used for the removal of acidic components from hydrocarbon distillate, the improvement which comprises oxidizing said caustic solution in the presence of vanadium phthalocyanine disulfonate.

19. The process of claim 7 further characterized in that said phthalocyanine catalyst comprises cobalt phthalocyanine associated with a charcoal carrier.

20. The process of claim 7 further characterized in that said phthalocyanine catalyst comprises vanadium phthalocyanine associated with a charcoal carrier.

References Cited in the file of this patent

UNITED STATES PATENTS

| 2,651,595 | Moulthrop | Sept. 8, 1953 |
| 2,659,691 | Gislon et al. | Nov. 17, 1953 |

OTHER REFERENCES

Cook: J. Chem. Soc., (1938) pages 1761–74 (from Chem. Abstracts, vol. 33, pages 1328–30).